Nov. 18, 1941.   H. DREYFUSS   2,263,123
RAILWAY CAR
Original Filed Dec. 3, 1936   3 Sheets-Sheet 1
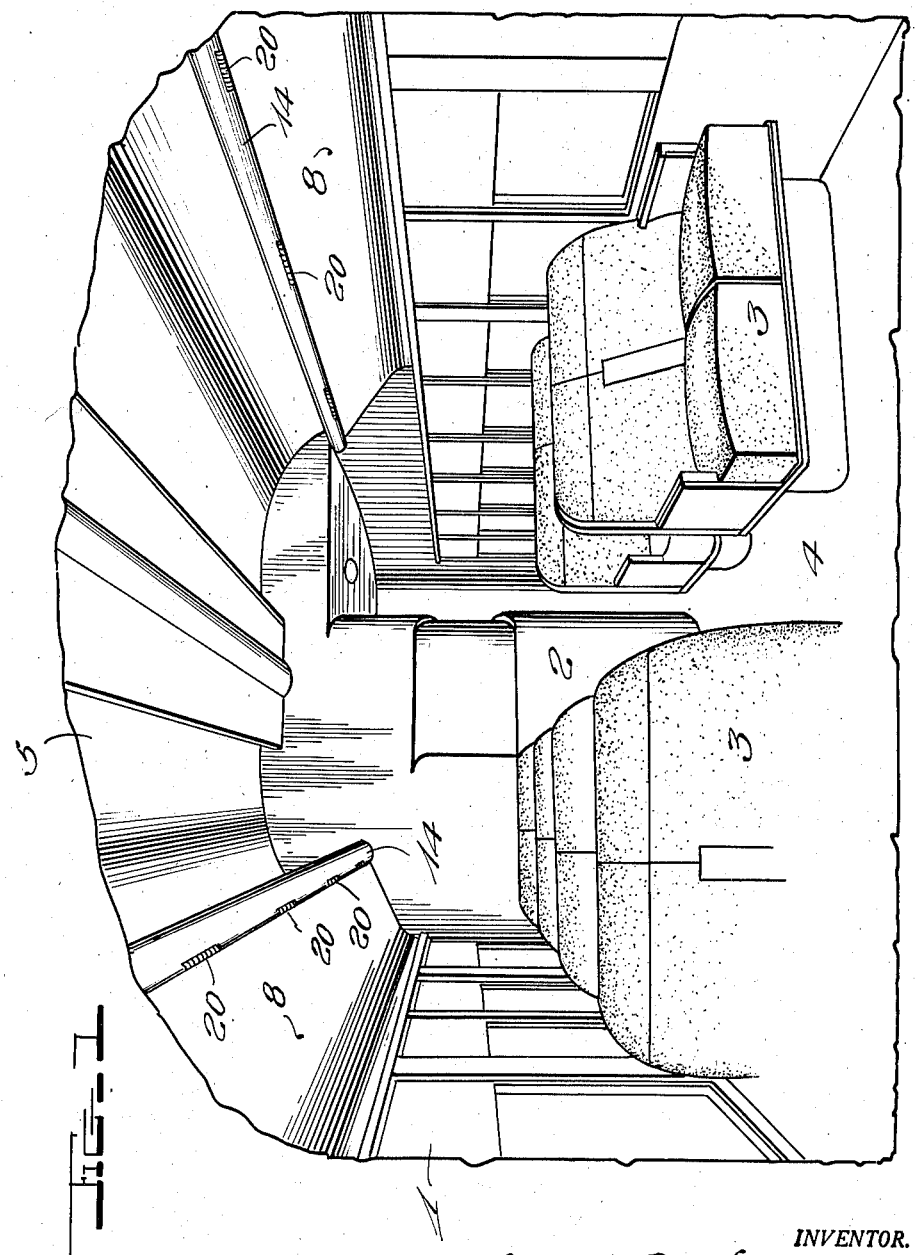
INVENTOR.
Henry Dreyfuss,
BY
Attorney

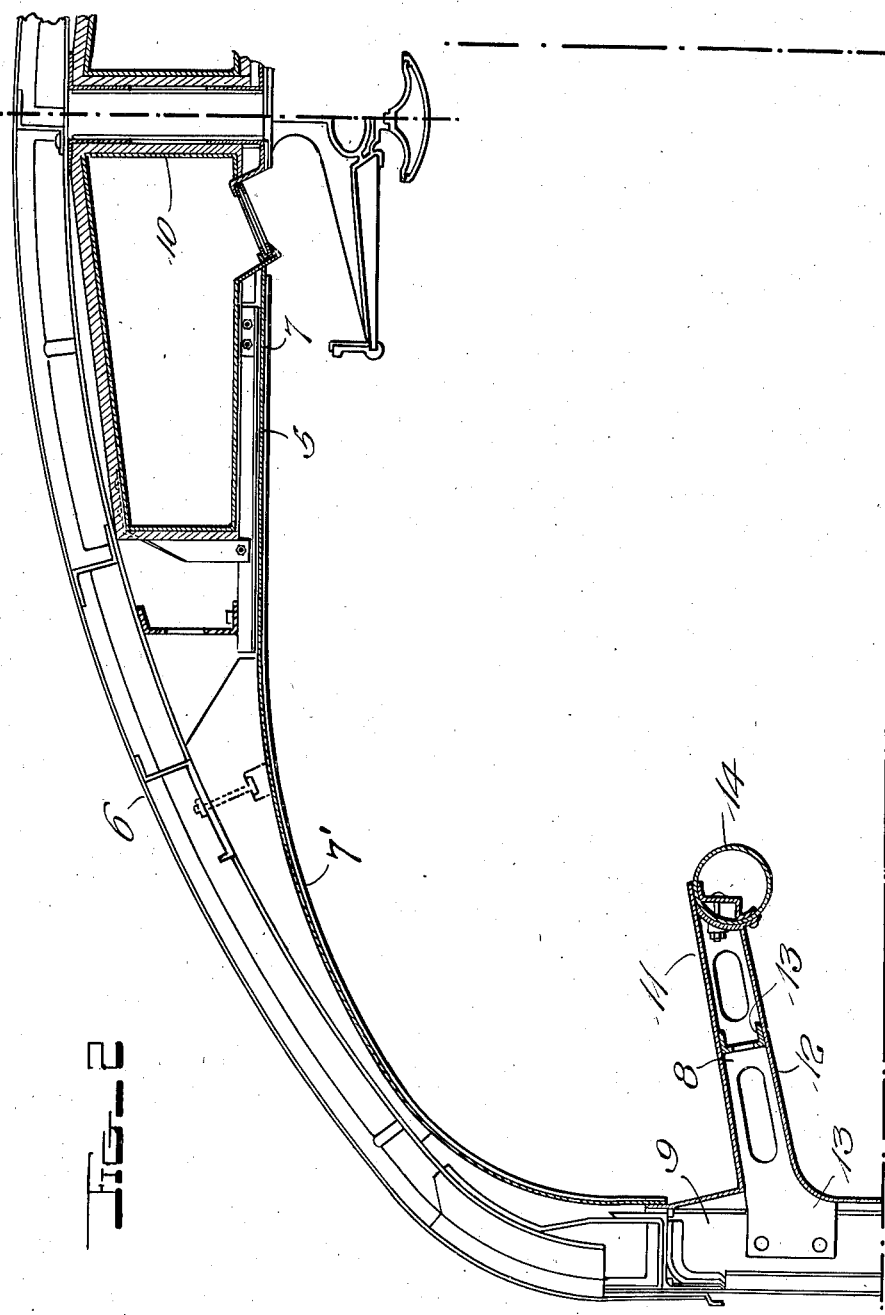

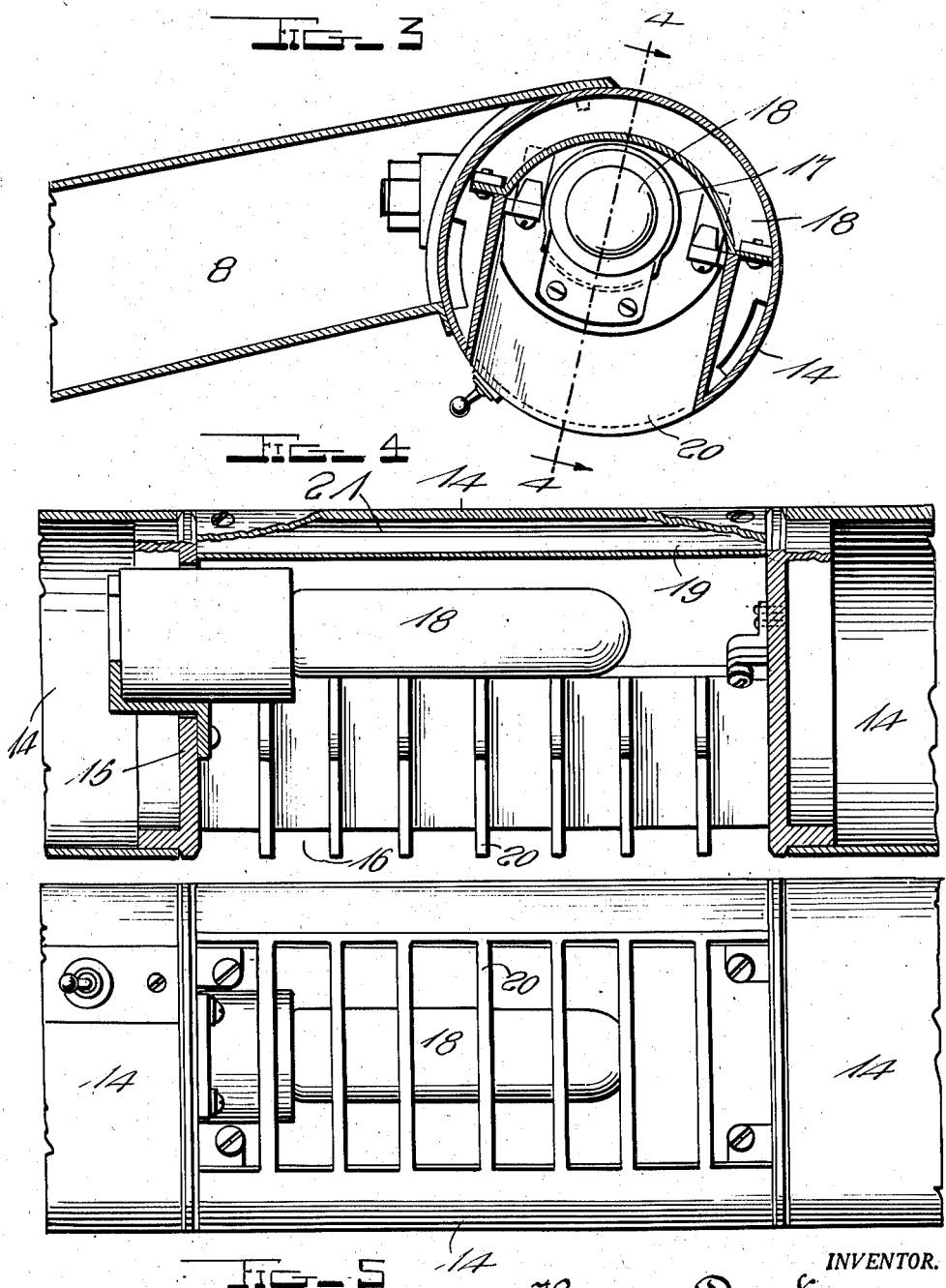

Patented Nov. 18, 1941

2,263,123

UNITED STATES PATENT OFFICE 2,263,123

RAILWAY CAR

Henry Dreyfuss, New York, N. Y., assignor to The New York Central Railroad Company, a corporation of New York Original application December 3, 1936, Serial No. 114,075. Divided and this application October 23, 1940, Serial No. 362,467

1 Claim. (Cl. 240—7.1)

This invention relates to improvements in railway passenger cars, and particularly to novel means for illuminating the passenger compartment of a coach or other passenger car and novel means for supplying conditioned air to the passenger compartment of the car, the arrangement being such as to provide for localized illumination of the passenger compartment above or in the immediate neighborhood of each passenger seat, so that effective illumination may be obtained by the use of a combination of indirect and direct lighting units.

One object of the invention is to provide a general illuminating means comprising a row of lights near the ceiling of the car which are concealed from view but from which the light rays are so directed as to indirectly illuminate the car throughout its seating area in a highly effective and pleasing manner.

Another object of the invention is to provide concealed lighting means which may form part of the basket or luggage racks for illuminating the sides of the passenger compartment of the car above the seats so as to give the occupants of each seat adequate light for reading or other purposes, without glare or the direct shining of the lights into the eyes of the seat occupants.

With these and other objects in view, the invention consists of the features of construction, combination and arrangement of parts, hereinafter fully described and claimed, reference being had to the accompanying drawings.

This is a division of my application Serial No. 114,075, filed December 3, 1936, Patent No. 2,238,847, dated April 15, 1941.

In the drawings:

Figure 1 is a perspective view of a portion of the interior of a railway passenger coach embodying my invention.

Figure 2 is a vertical transverse sectional view of a portion of the top of a car.

Figure 3 is a detailed transverse section through the rail of one of the basket or luggage racks, showing a light fixture therein.

Figure 4 is a longitudinal section on the line 4—4, Figure 3.

Figure 5 is a bottom plan view of the parts shown in Figures 2 and 4.

Referring now more particularly to the drawings, 1 designates a railway passenger car, shown herein as one of coach type, said car having a passenger compartment 2 provided with rows of seats 3 arranged on opposite sides of a center aisle or passageway 4.

The car has a ceiling 5 arranged below its roof 6, the central portion 7 of which ceiling is disposed in a substantially horizontal plane, while the side portions 7' thereof preferably extend from said central portion downwardly and outwardly toward the side walls 9 of the car on suitably curved lines. The central portion of the ceiling is supported from and held in spaced relation to the roof by a pair of spaced channel iron beams or supports 10.

Mounted upon the side walls of the car beneath the ceiling and above the rows of seats 3 are basket or luggage racks 8 which may be of either open or closed type, but which are shown in the present instance as of closed type and comprising spaced upper and lower walls 11 and 12 secured at spaced intervals to supporting brackets 13 mounted on the side walls 9. Each of these racks is provided with an outer hollow or circular rim or rail portion 14, whereby it is stiffened at this point and given a desired finish or ornamental contour. This rail is utilized as a support for auxiliary light fixtures, the light fixtures in the rail of each luggage rack being preferably equal in number to and arranged above the individual seats 3 at the adjacent side of the car. Each of these light fixtures comprises a casing 15 arranged between divisions of the rail 14 and provided in its bottom with a light outlet or emission opening 16. One end of the casing 15 supports a socket 17 in which is fitted an electric lamp 18, which as herein shown is one of tubular type. The upper part of the casing 15 is preferably double-walled and provided with a dead air space 21 to reduce the amount of heat transmitted from the lamp to the outer wall. In the casing is a light reflector 19 which comprises or may be formed on the inner wall of said upper part of the casing. The outlets 16 of the lamp casings are so arranged as to direct the light rays downwardly and at an angle toward the seats 3, so as to localize direct illumination above and in the region of each seat suitable for reading and other purposes. A baffle device provided with rows of spaced baffle plates or louvres 20 projecting into the opening is provided for directing the light rays at the proper angle and concealing the lamp 18 from the view of passengers walking along the center aisle or occupying the seats, whereby the glare of light into the eyes of passengers is prevented. By this means provision is made for furnishing additional lights at the sides of the car localized with respect to the individual seats so as to increase the degree of illumination at each of these points, these rack lights also serving by the character of the illumination they cast to give with the general illuminating means at the ceiling center a direct lighting effect of highly pleasing character.

From the foregoing it will be seen that my invention provides means for generally illuminating portions of the car in the region of passenger seats in a direct manner, whereby full and adequate illumination is furnished without casting glare and whereby the occupants of the seats may engage in reading or other occupations requiring use of the eyes without causing eye strain.

While the structural organization shown for the purposes is preferred, it is to be understood that this is merely exemplificative, and that changes in the form, construction and arrangement of the parts may be made within the scope of the appended claim, without departing from the spirit or sacrificing any of the advantages of the invention.

What I claim is:

A baggage rack for passenger vehicles extending throughout the length of the passenger space thereof and extending from the side walls of the vehicle to a point over the passenger seats of the vehicle, a tubular rail of circular cross section forming the outer free edge of said rack and having light emitting apertures at spaced intervals in its under face throughout its length over the passenger seats, non-glare means associated with said apertures and a source of light concealed within said tubular rail.

HENRY DREYFUSS.